United States Patent [19]

Meintjes

[11] Patent Number: 5,472,806
[45] Date of Patent: Dec. 5, 1995

[54] ELECTROCHEMICAL CELL

[75] Inventor: Anthony A. Meintjes, Lynnwood Glen, South Africa

[73] Assignee: Programme 3 Patent Holdings, Luxembourg

[21] Appl. No.: 285,029

[22] Filed: Aug. 2, 1994

[30] Foreign Application Priority Data

Aug. 3, 1993 [ZA] South Africa .............. 93/5610

[51] Int. Cl.$^6$ .............. H01M 10/30; H01M 2/14
[52] U.S. Cl. .............. 429/165; 429/103; 429/104; 429/164
[58] Field of Search .............. 429/103, 164, 429/165, 193, 104

[56] References Cited

U.S. PATENT DOCUMENTS

| 4,405,696 | 9/1983 | Fischer et al. | 429/104 |
| 4,722,875 | 2/1988 | Wright | 429/103 |
| 4,910,105 | 3/1990 | Tilley et al. | 429/103 |
| 5,279,908 | 1/1994 | Bones et al. | 429/102 |
| 5,340,668 | 8/1994 | Redey et al. | 429/103 |

FOREIGN PATENT DOCUMENTS 2244594  12/1991  United Kingdom.

OTHER PUBLICATIONS

Search Report, GB 9415583.5, dated 23 Sep. 1994.

Primary Examiner—Stephen Kalafut
Assistant Examiner—Richard H. Lilley
Attorney, Agent, or Firm—Arnold, White & Durkee

[57] ABSTRACT

A high temperature rechargeable electrochemical cell has a housing containing an anode and a cathode, and divided by a sodium ion-conducting solid electrolyte separator into an anode compartment and a cathode compartment, containing respectively molten sodium active anode material and active cathode material. The separator is tubular, having a closed end and an open end, and a plurality of circumferentially spaced radially outwardly projecting ribs or lobes. The housing is a tubular canister which is polygonal in cross-section, so that it has a plurality of circumferentially spaced corners corresponding in number to the number of lobes of the separator. The separator is concentrically located in the housing, each lobe of the separator being circumferentially aligned with, and projecting radially from the separator towards, one of said corners.

6 Claims, 3 Drawing Sheets

1

ELECTROCHEMICAL CELL

THIS INVENTION relates to an electrochemical cell. More particularly, the invention relates to a high temperature rechargeable electrochemical cell and to a separator for such cell.

SUMMARY OF INVENTION

According to the invention there is provided a high temperature rechargeable electrochemical cell having a housing containing an anode and a cathode, the housing having an interior divided by a solid electrolyte separator into a pair of electrode compartments, namely an anode compartment and a cathode compartment, containing respectively active anode material and active cathode material, the active anode material being sodium and the cell having an operating temperature at which the sodium is molten, the separator being a conductor of sodium ions, the separator being tubular or cup-shaped, having a closed end and an open end, and having a plurality of circumferentially spaced radially outwardly projecting ribs or lobes, the housing being in the form of a canister which is polygonal in cross-section, so that it has a plurality of circumferentially spaced corners corresponding in number to the number of lobes of the separator, the separator being concentrically located in the housing, each lobe of the separator being circumferentially aligned with, and projecting radially from the separator towards, one of said corners.

The canister may have a base for supporting the cell in an upright operative attitude on a flat upwardly horizontal support surface with the closed end of the separator lowermost, the cathode comprising an electronically conductive porous electrolyte-permeable matrix having a porous interior impregnated with a sodium aluminium chloride molten salt electrolyte which is molten at the cell operating temperature and in which the atomic ratio of Al cations:Na cations is $\leq 1:1$, the matrix containing, dispersed in its porous interior, the active cathode material, the active cathode material comprising at least one transition metal selected from the group consisting in Fe, Ni, Cr, Co, Mn and Cu, the cell having a charged state in which the active cathode material is chlorinated.

The housing may be regular-polygonal, eg a square or hexagonal metal canister, in cross-section, the cross-section permitting the cell to be close-packed in side-by-side relationship with a plurality of identical cells, in which case the number of lobes may respectively be four or six, as the case may be, being regularly circumferentially spaced.

Preferably the cell has both a cathode in the form of a matrix as described above and a housing of polygonal cross-section as described above. In a particular embodiment of the invention, while the housing may in principle be circular in cross-section, said cross-section of the housing is preferably rectangular, eg square, the separator being cruciform in horizontal cross-section, and having four said lobes. The entire volumes of the anode and of the cathode may be contained respectively in the associated electrode compartments, so that there is no external reservoir of electrode material, the capacity of the anode in the anode compartment being matched with that of the cathode in the cathode compartment. In other words, all the active anode material may be contained in the anode compartment, inside the housing, all the active cathode material being contained in the cathode compartment, inside the housing, and the volume ratio of the cathode compartment:anode compartment being 1,8:1–2,2:1. The anode-side surface of the separator may be lined with wicking material for wicking molten sodium over said surface. This wicking material may be in the form of a lining of metal mesh or gauze, eg stainless steel, in contact with or closely spaced by a capillary space from the separator surface. Thus, in particular, the anode-side surface of the separator may be lined with a wicking lining for wicking molten sodium over said surface, the separator being in the form of a sintered unitary polycrystalline ceramic artifact formed from a solid electrolyte selected from sodium β-alumina, sodium β"-alumina and nasicon.

The cathode may be located outside the separator, between the separator and the housing and surrounding the separator, with the anode inside the interior of the separator, in which case the separator may have an anode current collector, eg in the form of a metal post such as a steel or nickel post, projecting downwardly into its interior from its open upper end, to a position adjacent and spaced closely from its closed lower end. Instead, the anode may be located outside the separator, between the separator and the housing and surrounding the separator, with the cathode inside the separator and having a similar metal post current collector from which optional extensions may extend into each lobe to improve current collection. It will be appreciated that the interior of the housing is divided by said separator into the anode compartment and the cathode compartment, one of which is in the interior of the separator and the other of which is between the separator and the housing. Whether the anode is inside the separator with the cathode outside the separator, or vice versa, the volume ratio of cathode compartment:anode compartment may, as indicated above, be 1,8:1–2,2:1, preferably 2:1.

The separator may be in the form of a sintered pressing, being made in a fashion similar to conventional separator tubes of circular cross-section, by pressing a layer of powder on to a mandrel, eg by isostatic pressing, the powder being of a solid electrolyte or a precursor thereof which is converted to solid electrolyte by sintering, the mandrel being removed after the pressing to leave a green separator, and the green separator being sintered to provide the separator in the form of a sintered polycrystalline ceramic artifact. The separator may, as indicated above, be of β-alumina, nasicon or, preferably, β"-alumina.

According to another aspect of the invention there is provided a high temperature rechargeable electrochemical cell having a housing containing an anode and a cathode, the housing having an interior divided by a solid electrolyte separator into a pair of electrode compartments, namely an anode compartment and a cathode compartment, containing respectively active anode material and active cathode material, the active anode material being sodium and the cell having an operating temperature at which the sodium is molten, the separator being a conductor of sodium ions, the cathode comprising an electronically conductive porous electrolyte-permeable matrix having a porous interior impregnated with a sodium aluminium chloride molten salt electrolyte which is molten at the cell operating temperature and in which the atomic ratio of Al cations:Na cations is $\leq 1:1$, the matrix containing, dispersed in its porous interior, active cathode material comprising at least one transition metal selected from the group consisting in Fe, Ni, Cr, Co, Mn and Cu, the cell having a charged state in which the active cathode material is chlorinated, the housing being in the form of a canister having a base for supporting the cell in an upright operative attitude on a flat upwardly facing horizontal support surface, the separator being tubular or cup-shaped, having a closed lower end and an open upper end, and having a plurality of circumferentially spaced radially outwardly projecting ribs or lobes, the maximum diameter:minimum diameter ratio of the separator being at most 4:1.

When the separator is intended to contain a cathode, the maximum diameter:minimum diameter ratio of the separator may be in the range of 1,8:1–2,2:1, preferably 1,95:1–2, 05:1. When it is intended to contain an anode, this ratio may be 2,4:1–4:1, preferably 3,0:1–3,4:1.

BRIEF DESCRIPTION OF DRAWINGS

The invention will now be described, by way of example, with reference to the following Example and the accompanying diagrammatic drawings, in which.

DETAILED DESCRIPTION OF DRAWINGS

Figure 1:
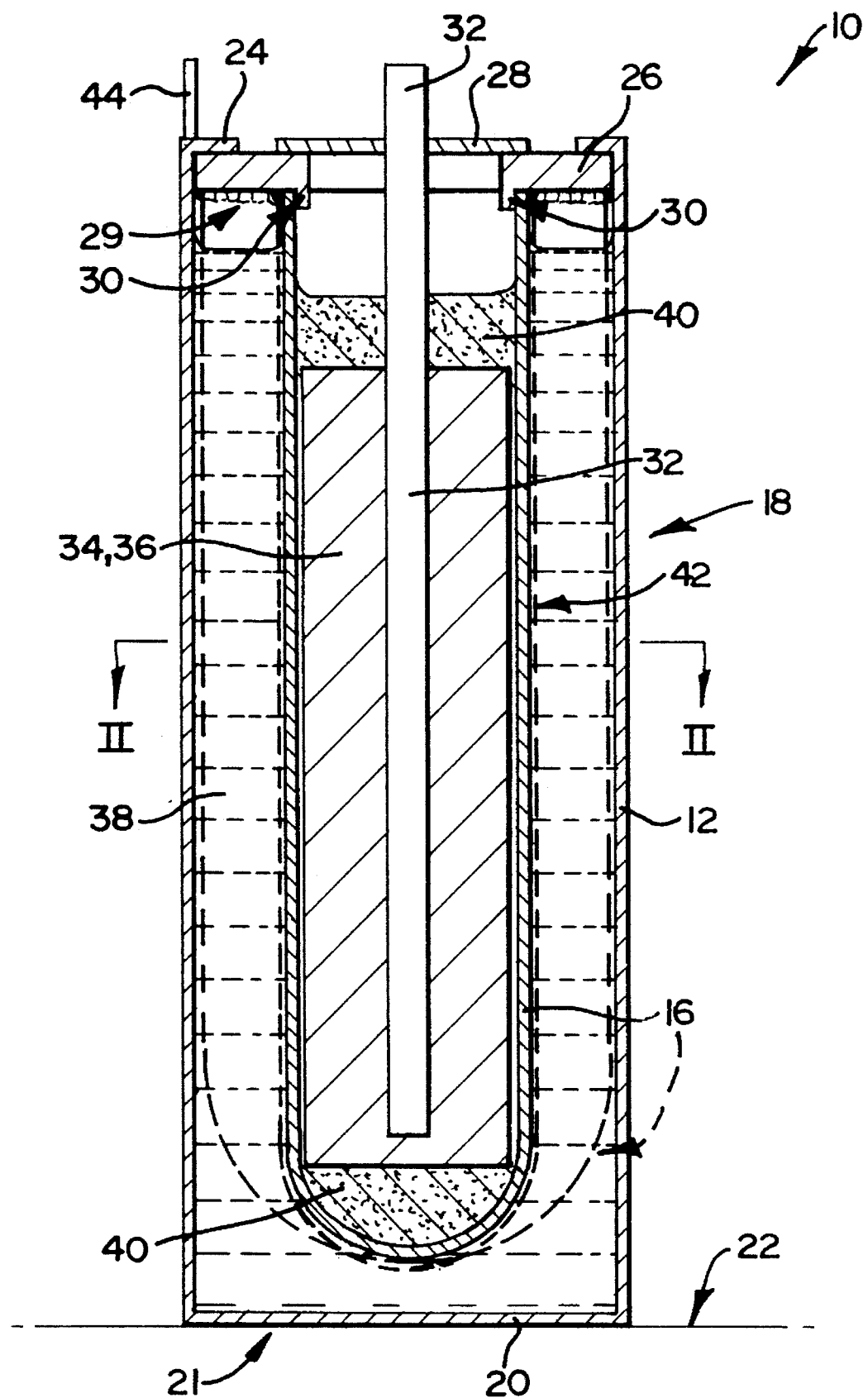
FIG. 1 shows a schematic sectional side elevation of a cell according to the invention taken in the direction of line I—I in FIG. 2.
Figure 2:
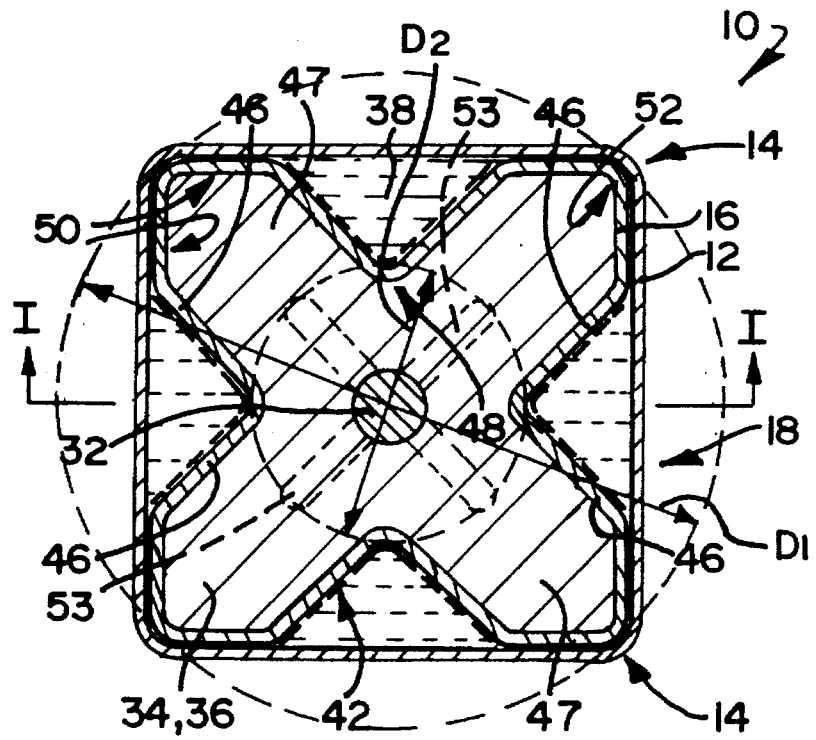
FIG. 2 shows a schematic horizontal cross-section or sectional plan view of the cell of FIG. 1, in the direction of line II—II in FIG. 1.

In FIG. 1 of the drawings, reference numeral 10 generally designates a rechargeable high temperature electrochemical power storage cell in accordance with the present invention. The cell 10 comprises a mild steel housing in the form of a canister 12 which is elongated in a vertical direction and is substantially square in cross-section, having rounded corners at 14 (FIG. 2). The cell 10 has a tubular, roughly cup-shaped β"-alumina separator 16 located concentrically in the interior of the housing 12, the separator having a closed lower end and an open upper end, and being described in more detail hereunder.

The canister 12 has side walls 18 and a lower end provided with a square floor panel 20 welded to the lower edges of the walls 18, which panel 20 provides, with the lower edges of the walls 18, a base 21 for supporting the cell in an upright condition on a flat horizontal upwardly facing support surface 22 as shown in FIG. 1. The closed lower end of the separator 16 is spaced above said floor panel 20. The upper end of the canister 12 is closed off by a square upper closure in the form of a mild steel closure panel 24, welded to the upper edges of the walls 18. The closure panel 24 has a central opening therein, sealed off by electronically insulating material in the form of an α-alumina insulating ring 26 of more or less square plan view outline, the ring 24 having a flat upper surface thermocompression bonded to the lower surface of the panel 24, at the periphery of the central opening in the panel 24. The ring 26 has a central opening therethrough, closed off by a mild steel closure disc 28 thermocompression bonded to its flat upper surface and spaced radially inwardly by an insulating space from the panel 24. The open upper end of the separator 16 is glass-welded at 29 into a rebate 30 provided therefor in the periphery of the lower surface of the ring 26, which lower surface is flat. A nickel current collector post 32 projects inwardly from the exterior of the housing 12, through the closure disc 28, the post having an upper end, projecting upwardly above the disc 28, which provides a cell cathode terminal 32. The lower end of the post, which extends along the axis of the cell 10, is spaced above the closed lower end of the separator 16, in its interior.

The interior of the separator 16 contains a cathode 34 which comprises a porous iron matrix 36 having a porous, liquid-permeable interior, the pores of which are saturated with NaAlCl$_4$, comprising a substantially equimolar mixture of NaCl and AlCl$_3$ and which is molten at the cell operating temperature, the housing 12, outside the separator 16, containing an anode 38 of sodium, which is similarly molten at the operating temperature of the cell. NaCl in finely divided form is dispersed in the porous interior of the matrix 36 in all states of charge of the cell, and the matrix 36 is immersed in the molten salt NaAlCl$_4$ electrolyte, shown at 40, which electrolyte is doped with doping amounts of FeS and NaF, as is known in the art. The post 32 is, in the interior of the separator 16, embedded in the matrix 36. The outer surface of the separator 16 is lined by a stainless steel mesh gauze 42 for wicking molten sodium 38 on to said surface; and the canister 12, which forms an anode current collector is provided with an anode terminal 44.

Referring now to FIG. 2, in which the same reference numerals refer to the same parts as in FIG. 1, unless otherwise specified, it will be noted that the separator is cruciform in cross-section, ie in plan view outline, having four lobes 46 which are regularly circumferentially spaced by 90° from each other and respectively project into the corners 14 of the canister 12, from which they are closely spaced, each containing a lobe 47 of the matrix 36 of the cathode 34. Each lobe 46 has an interior volume, radially outwardly of its root at 48 where it is connected to the adjacent lobes 46, amounting to about ⅕th of the interior volume of the separator 16, the volume of the central part of the separator interior, radially inwardly of the roots 48 of the lobes 46, also amounting to about ⅕th of the volume of the separator 16. The outer ends of the lobes 46 are tapered at 50 to form rectangular corners 52 which nest in the corners 14 of the canister 12. Optional extensions 53 (broken lines) of the current collector 32 are shown extending into the respective lobes 47 of the matrix 36 of the cathode 34. The maximum outer diameter:minimum outer diameter ratio D1:D2 shown in FIG. 2 is about 2,9:1.

Figure 3:
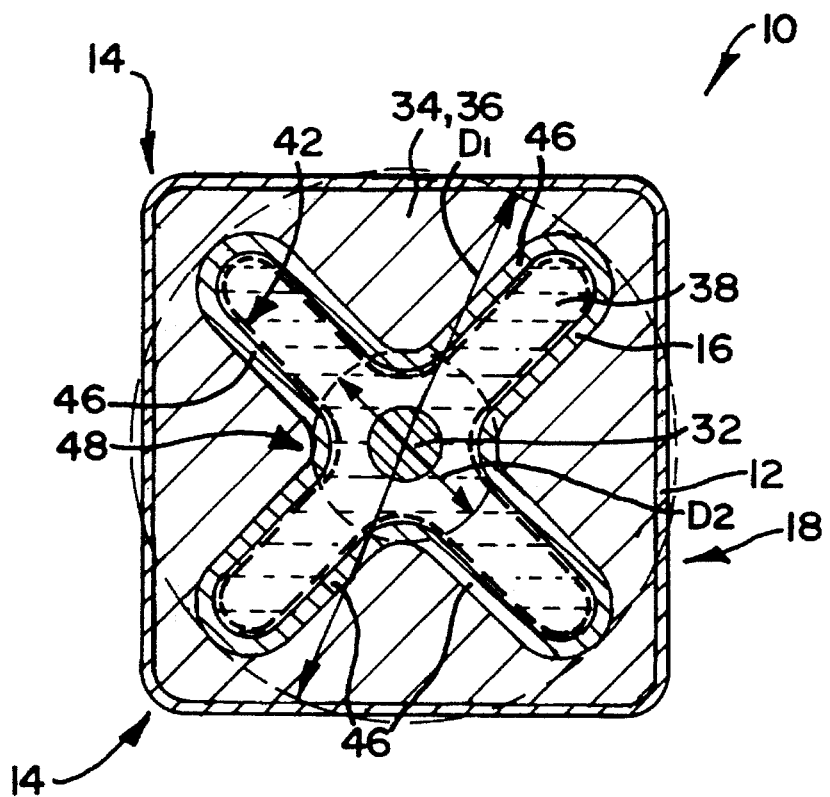
FIG. 3 shows a view, similar to FIG. 2, of a variation of the cell of FIG. 1.

FIGS. 1 and 2 accordingly show a cell of so-called inside-cathode/outside-anode construction, while FIG. 3, described hereunder, shows the reverse, namely a cell of inside-anode/outside-cathode construction.

In FIG. 3, unless otherwise specified, the same reference numerals refer to the same parts as in FIG. 1. As regards the construction of the canister 12 and its closure panel 24, and the connection of the closure panel 24 to the separator 14, the cell 10 of FIG. 3 is essentially similar to that of FIGS. 1 and 2, except that, naturally (as the separator 16 is of somewhat different horizontal cross-section as shown in FIG. 3 from that shown in FIG. 2), the rebate of the ring 26 is of a somewhat different peripheral outline from that of the rebate 30 of FIG. 1, the outline in plan view of the rebate 30 in FIG. 1 corresponding to the cross-section of the separator 16 of FIG. 2, and that of the rebate of the cell of FIG. 3 corresponding to the cross-section of the separator in FIG. 3.

In FIG. 3 the separator is somewhat smaller and of lower interior volume than that of FIG. 2, and its lobes 46 are shorter in the radial direction and are narrower, being spaced by a substantial spacing from the canister corners 14, with which they are aligned by and in which they do not nest. Each lobe again has a volume similar to that of the central part of the interior of the separator 16, radially inwardly of the roots 48 of the lobes, of about ⅕th of the separator volume. Naturally, in the case of FIG. 3, the terminal 33 is the anode terminal and the cathode terminal (not shown) is on the canister 12, the post 32 being an anode current collector and the canister 12 being the cathode current collector; and the matrix 36 is outside the separator 16 which contains the sodium 38, the interior surface of the separator 16 being lined by the mesh or gauze 42. The maximum outer diameter:minimum outer diameter ratio shown in FIG. 3 is about 2,4:1.

In each case (FIGS. 2 and 3) the volume of the cathode is about double that of the anode to promote effective volumetric efficiency. In each case the separator 16 can be regarded as a composite of four separator tubes, the lobes 46 respectively being equivalent in volume to each of these smaller tubes, which tubes can be visualized as being fixed together along their lengths, around a central space equivalent to a fifth tube, to form a composite monolith. The composite tube 16 has a surface area approximately equal to four such smaller tubes and a volume approximately equal to five such smaller tubes. The composite tube 16 thus has power characteristics similar to four said smaller tubes in parallel, and capacity equal to that of five such smaller tubes, the volume of the central space being capable of functioning as a capacity reserve of about 20%, when the capacities of the lobes 46 are consumed. Furthermore, importantly, the lobed, cruciform-cross-section of the composite tube 16 provides a substantially greater surface area than a right cylindrical tube of the same height and volume, thus providing for increased power for the same capacity.

Figure 4:
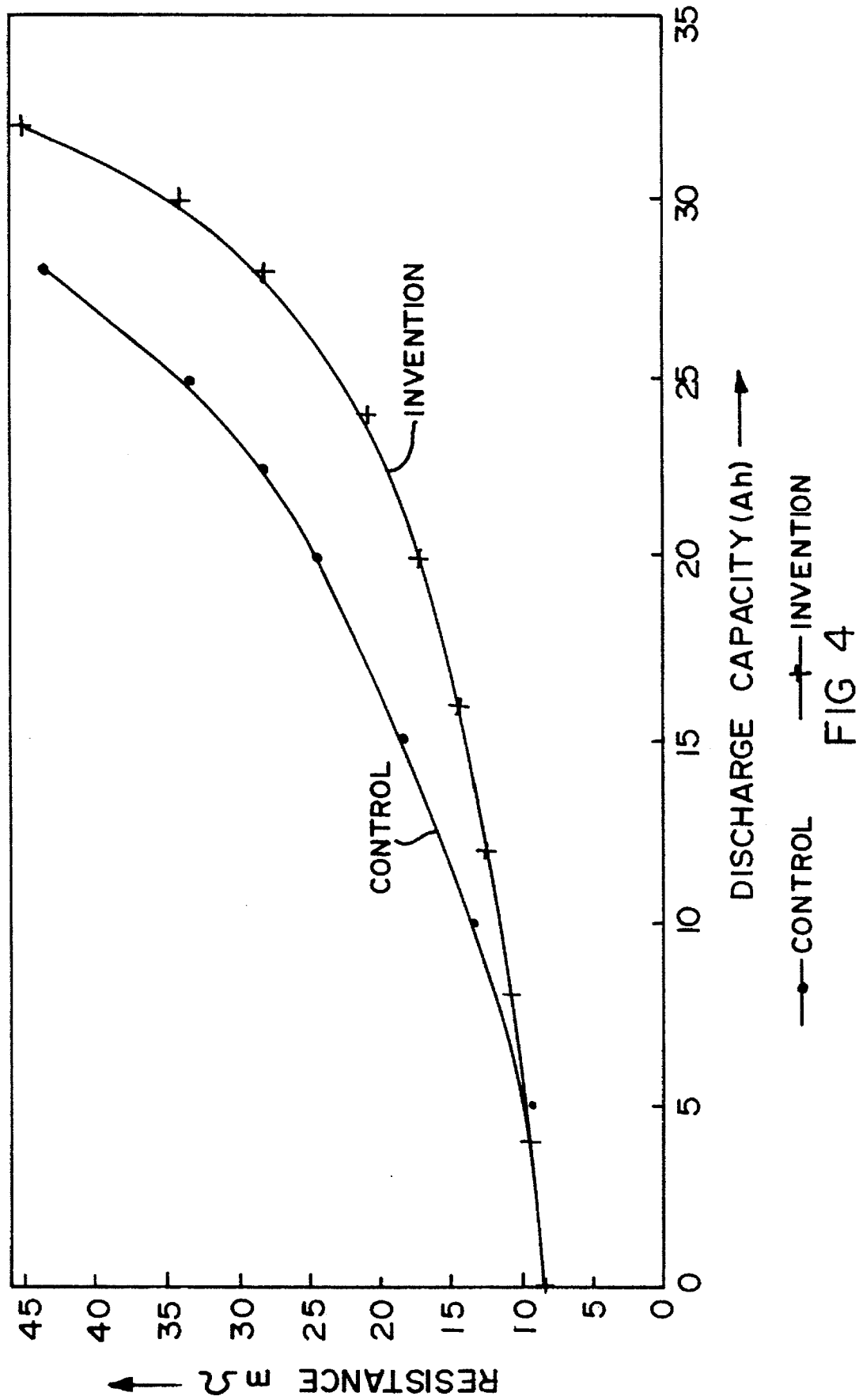
FIG. 4 shows a plot, for a cell according to FIG. 1 and a control cell of internal resistance in m$\Omega$ against cell state of charge in Ah.

In FIG. 4 the cell of FIGS. 1 and 2 is compared with a similar control cell having the same construction as that of FIGS. 1 and 2 with a canister 12 also of similar square horizontal cross-section and a right cylindrical separator tube 16 of the same wall thickness as that of FIGS. 1 and 2, the anode capacities of the cells being the same and the cathode capacities of the cells being the same, and said 2:1 cathode:anode volume ratio being the same, in each cell. From FIG. 4 it is apparent that during the early stages of discharge (eg <5Ah into the discharge cycle) internal resistance of the control cell and those of the cells according to FIGS. 1 and 2 are similar. However, further (>5Ah) into the discharge cycle the cell according to the present invention has a lower internal resistance than the control cell. This lower internal resistance arises from the increased separator area of the cell according to the invention compared with the control cell, and leads to enhanced power capability for the cell according to the invention. Similar improved results are expected, for the same reasons, for the cell of FIG. 3 compared with an equivalent control cell.

Furthermore, the lobes 46 are relatively thin, compared with what would be the cathode diameter of the control cell (of the same height and cathode volume). This means that a larger proportion of the active cathode material of the cells of the invention is closer to the separator than in the control cell, so that cell internal polarization and associated losses are reduced in the cells of the invention, compared with the control cell.

Both of these features, namely the lobe thicknesses of the separator of the invention, which is relatively low compared with the cathode diameter of the control cell, and the surface area of the separator, which is relatively high compared with that of the control cell, in each case contribute to enhanced power of cells according to the invention when compared with the control cells. These contributions are independent of each other but reinforce each other in raising cell power.

Furthermore, it is important to note that the feature of cells according to the present invention, whereby the lobes of the cell project into the corners of the housing, permits desirable cathode compartment:anode compartment volume ratios in the range of 1,8:1–2,2:1 easily to be obtained, in a close packing configuration of cells, which is important for efficient volume utilization. The separator cross-section contributes to this, while at the same time providing for improved power characteristics as set forth above, and the separator maximum diameter:minimum diameter ratios of 1,8:1–2,2:1 and 2,4:1–4:1 respectively for inside-cathode cells and outside-cathode cells contribute further to the combination of high power coupled with a desirable cathode compartment:anode compartment volume ratio.

What is claimed is:

1. A high temperature rechargeable electrochemical cell having a housing containing an anode and a cathode, the housing having an interior divided by a solid electrolyte separator into a pair of electrode compartments, namely an anode compartment and a cathode compartment, containing respectively active anode material and active cathode material, the active anode material being sodium and the cell having an operating temperature at which the sodium is molten, the separator being a conductor of sodium ions, the separator being tubular or cup-shaped, having a closed end and an open end, and having a plurality of circumferentially spaced radially outwardly projecting ribs or lobes, the housing being in the form of a tubular canister which is polygonal in cross-section, so that it has a plurality of circumferentially spaced corners corresponding in number to the number of lobes of the separator, the separator being concentrically located in the housing, each lobe of the separator being circumferentially aligned with, and projecting radially from the separator towards, one of said corners.

2. A cell as claimed in claim 1, in which the canister has a base for supporting the cell in an upright operative attitude on a flat upwardly facing horizontal support surface with the closed end of the separator lowermost, the cathode comprising an electronically conductive porous electrolyte-permeable matrix having a porous interior impregnated with a sodium aluminium chloride molten salt electrolyte which is molten at the cell operating temperature and in which the atomic ratio of Al cations:Na cations is $\leq 1:1$, the matrix containing, dispersed in its porous interior, the active cathode material, the active cathode material comprising at least one transition metal selected from the group consisting in Fe, Ni, Cr, Co, Mn and Cu, the cell having a charged state in which the active cathode material is chlorinated.

3. A cell as claimed in claim 1, in which the housing is regular-polygonal in cross-section, the cross-section permitting the cell to be close-packed in side-by-side relationship with a plurality of identical cells.

4. A cell as claimed in claim 3, in which the cross-section of the housing is rectangular, the separator being cruciform in horizontal cross-section, and having four said lobes.

5. A cell as claimed in claim 2, in which all the active anode material is contained in the anode compartment, inside the housing, all the active cathode material being contained in the cathode compartment, inside the housing, and the volume ratio of the cathode compartment:anode compartment being 1,8:1–2,2:1.

6. A cell as claimed in claim 1, in which the anode-side surface of the separator is lined with a wicking lining for wicking molten sodium over said surface, the separator being in the form of a sintered unitary polycrystalline ceramic artifact formed from a solid electrolyte selected from sodium β-alumina, sodium β″-alumina and nasicon.

\* \* \* \* \*

UNITED STATES PATENT AND TRADEMARK OFFICE
CERTIFICATE OF CORRECTION

PATENT NO. : 5,472,806

DATED : December 5, 1995

INVENTOR(S) : Anthony A. Meintjes

It is certified that error appears in the above-identified patent and that said Letters Patent is hereby corrected as shown below:

In claim 2, column 6, line 41, delete "$\leq$" and insert --$\leq$-- therefor.

Signed and Sealed this

Twenty-seventh Day of February, 1996

Attest:

BRUCE LEHMAN

*Attesting Officer*   *Commissioner of Patents and Trademarks*